United States Patent Office.

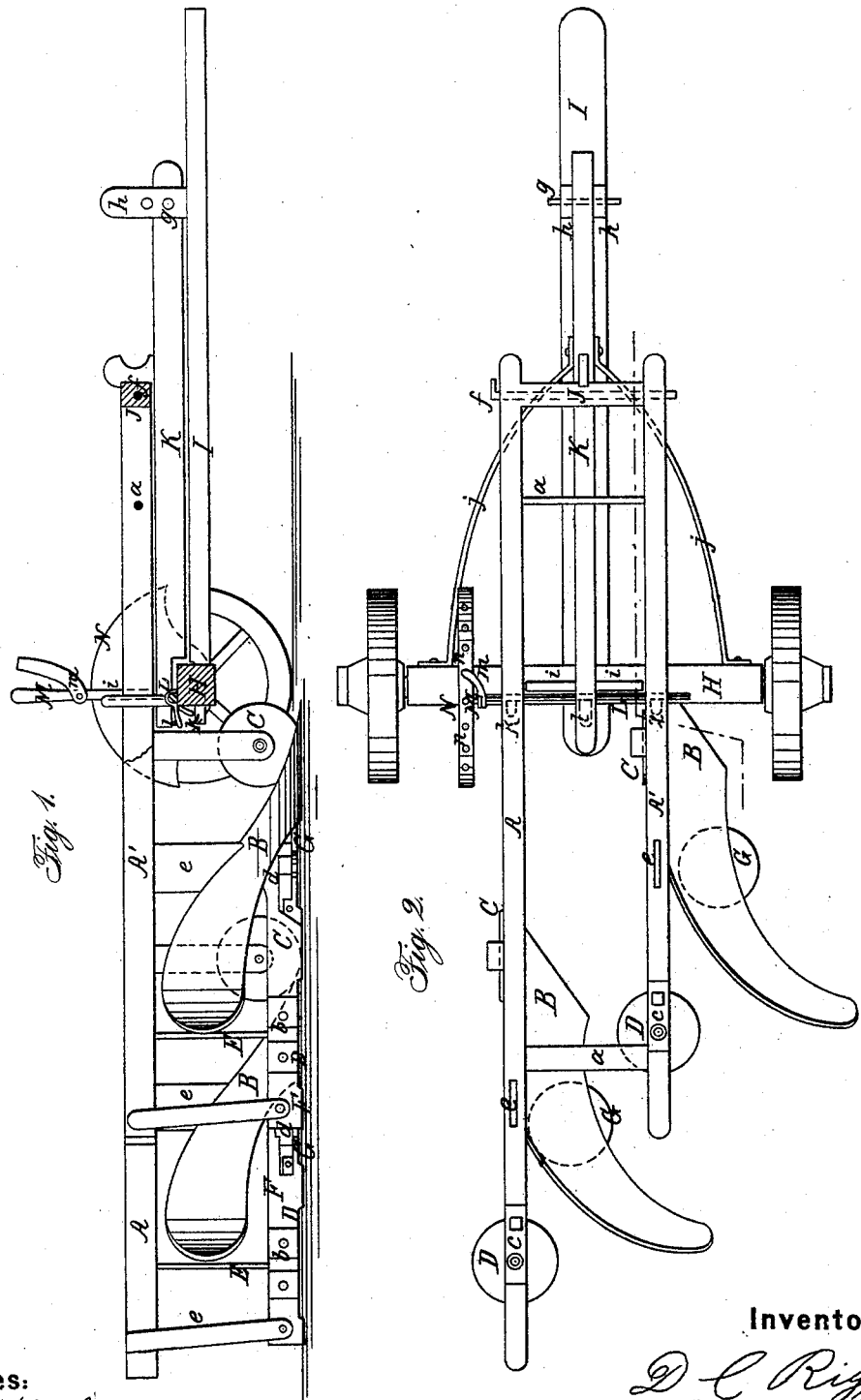

D. C. RIGGS, OF ST. JOSEPH, MISSOURI.

Letters Patent No. 67,351, dated July 30, 1867.

---

IMPROVEMENT IN GANG-PLOUGHS.

---

*The Schedule referred to in these Letters Patent and making part of the same.*

---

TO ALL WHOM IT MAY CONCERN:

Be it known that I, D. C. RIGGS, of St. Joseph, in the county of Buchanan, and State of Missouri, have invented a new and improved Gang-Plough; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved gang-plough, and it consists in a novel and improved construction of the same, whereby the ploughs may be readily raised out of the ground when required, and the device placed under the complete control of the operator, while the ploughs arranged in connection with rotary cutters are made to operate with far greater facility than usual, and the draught of the machine thereby greatly reduced. In the accompanying sheet of drawings—

Figure 1 is a side sectional view of my invention.

Figure 2, a plan or top view of the same.

Similar letters of reference indicate like parts.

A A' represent the plough-beams, which may be constructed of wood, and one, A, a trifle longer than the other, A'. These beams are connected by cross-bars $a$, and their front ends are even or in line with each other. The ploughs B are attached to the rear part of the plough-beams, one plough being in advance of the other, as shown in both figures. The ploughs are quite narrow, both share and mould-board about half the usual width, and at the front end of each plough there is a vertical rotary cutter, C, which serves the office of a coulter, and these coulters, in connection with the shares, make what may be termed the first cut, three cuts in all being made by the ploughs and their coulters. The second cut is made by horizontal cutters D, which are placed on the lower ends of vertical shafts E, the lower bearings $b$ of which are attached to the land-sides F, and the upper bearings fitted in adjustable plates $c$ on the beams, the adjustable plates admitting of a requisite adjustment of the cutters D, the shafts E being moved further forward or backward, so as to give a slight dip to the cutters, more or less, as required, which, as will be seen by referring to fig. 2, project beyond the left-hand side of the land-sides F, nearly half their diameter. These horizontal cutters cut under one-half the space or width of the slice to be turned over at the succeeding "bout" or return movement of the plough, and they greatly relieve friction, hitherto attending the bearing of the land-side against the unploughed surface. The third cut is made by horizontal rotary cutters G, which are placed just back of the shares of the ploughs, and extend out from the right-hand side thereof, as shown clearly in fig. 2. These front cutters have their axes fitted in bearings $d$, which are secured to the land-sides F, and the latter are secured to the beams by proper standards $e$. These horizontal cutters cut the under side of the sod or furrow-slice, severing it from the subsoil, and admitting of it being readily turned by the mould-boards, and effectually obviating the compacting of the earth at the bottom of the furrows. H represents the front axle, into which the draught-pole I is loosely framed to admit of a certain degree of play or longitudinal movement. The plough-beams A A' rest on the axle, and between the front ends of the beams there is fitted a block, J, through which and the beams a pin, $f$, passes, the block J being allowed to turn freely. This block J has what I term an elevating-bar, K, attached to it, and the front end of the bar K is secured by a pin, $g$, between two uprights, $h\ h$, on the draught-pole, the rear part of the elevating-bar being between two uprights, $i\ i$, on the axle H. The elevating-bar is also connected to the axle H by curved metal bars $j\ j$, and upon the axle H there is fitted a shaft, L, which is provided with three arms, $k\ k\ l$, the two former of which are underneath the beams A A', and the latter underneath the elevating-bar K. The arm $l$ is rather more elevated than the arms $k\ k$. (See fig. 1.) To one end of the shaft L a lever, M, is attached, provided with a catch or fastening, $m$, to engage with any one of a series of holes, $n$, in a semicircular plate, N, secured to the axle H. By turning the shaft L a trifle, the arm $l$ will come in contact with the elevating-bar K, and raise the ploughs, and by this means the ploughs may be made to penetrate the earth at a greater or less depth, as may be desired, and by turning said shaft a trifle further, the arms $k\ k$ will be brought in contact with the beams A A', and the ploughs raised entirely out of the ground, so that the machine may be drawn from place to place with the greatest facility.

Having thus described my invention, I claim as new, and desire to secure by Letters Patent—

1. In combination with the ploughs B the employment or use of horizontal rotary cutters D G, arranged and applied to operate in the manner substantially as and for the purpose set forth.

2. The lifting or elevating-bar K, when arranged in connection with the axle, draught-pole, and plough-beams, to operate in the manner substantially as and for the purpose specified.

3. The shaft L on the axle H, provided with the arms $k$ $k$ $l$, and arranged in relation with the elevating-bar and plough-beams, to operate in the manner as and for the purpose set forth.

D. C. RIGGS.

Witnesses:
    J. F. RIGGS,
    M. A. RIGGS.